(12) United States Patent
Peterson

(10) Patent No.: US 9,955,558 B1
(45) Date of Patent: *Apr. 24, 2018

(54) SELF-CONTAINED, REMOVABLE, WIRELESS TURN SIGNAL SYSTEM FOR MOTOR VEHICLES AND TRAILERS

(71) Applicant: SmartSignals Technologies, Inc., Wakefield, RI (US)

(72) Inventor: John Samuel Peterson, Kingston, RI (US)

(73) Assignee: SmartSignals Technologies, Inc., Wakefield and Kingston, RI (US)

( * ) Notice: Subject to any disclaimer, the term of this patent is extended or adjusted under 35 U.S.C. 154(b) by 182 days.

This patent is subject to a terminal disclaimer.

(21) Appl. No.: 14/324,882

(22) Filed: Jul. 7, 2014

Related U.S. Application Data

(63) Continuation of application No. 12/798,219, filed on Mar. 31, 2010, now Pat. No. 8,816,840.

(60) Provisional application No. 61/212,023, filed on Apr. 4, 2009.

(51) Int. Cl.

| | |
|---|---|
| *B60Q 1/34* | (2006.01) |
| *H05B 37/02* | (2006.01) |
| *F21S 8/10* | (2006.01) |
| *F21L 4/04* | (2006.01) |
| *F21L 4/08* | (2006.01) |
| *H05B 33/08* | (2006.01) |

(52) U.S. Cl.
CPC .......... *H05B 37/0272* (2013.01); *B60Q 1/34* (2013.01); *F21L 4/04* (2013.01); *F21L 4/08* (2013.01); *F21S 48/255* (2013.01); *H05B 33/0845* (2013.01)

(58) Field of Classification Search
CPC ............ H05B 37/0227; H05B 37/0218; H05B 37/0272; H05B 37/0281; H05B 33/0854; H05B 37/0245; H05B 37/0254; H05B 37/0263; H05B 37/03; B60Q 1/076; B60Q 1/085; B60Q 2300/45; F21S 48/171; F21S 48/1731
USPC ..... 340/465, 425.5, 463–464, 468, 472–473, 340/478, 482, 488, 506–508, 514, 458, 340/475

See application file for complete search history.

(56) References Cited

U.S. PATENT DOCUMENTS

| | | |
|---|---|---|
| 4,834,060 A | 5/1989 | Greene |
| 5,135,258 A | 8/1992 | Buxton |
| 5,157,338 A | 10/1992 | Motherbaugh et al. |
| 5,195,813 A | 3/1993 | Brown |
| 5,666,103 A | 9/1997 | Davis, Jr. |

(Continued)

OTHER PUBLICATIONS

PCT International Search Report and the Written Opinion of the International Searching Authority for International Application No. PCT/US14/52257, dated Jan. 15, 2015, 11 pgs.

*Primary Examiner* — Daniel Previl

(57) ABSTRACT

A remote-controlled turn signal unit for a vehicle or trailer is provided. In one embodiment, an LED array and digital transceiver are embedded into a traditional bulb housing. This bulb can then be placed into existing tail or other light sockets on the exterior of a vehicle and can serve as turn signals being actuated by radio. This bulb can also be part of a self-contained magnetic housing that can be attached temporarily to the vehicle. This self-contained unit contains miniature digital radio, rechargeable battery, and LED light assembly, but does not rely upon or required modification of the vehicle's electrical system.

3 Claims, 1 Drawing Sheet

(56) References Cited

U.S. PATENT DOCUMENTS

| | | | |
|---|---|---|---|
| 6,066,951 A | 5/2000 | Maass | |
| 6,404,073 B1 | 6/2002 | Chiang | |
| 6,474,853 B2 | 11/2002 | Pastrick et al. | |
| 6,891,338 B2 | 5/2005 | Kubo | |
| 7,296,917 B1 | 11/2007 | Chiu | |
| 7,921,997 B2 | 4/2011 | Burns | |
| 8,816,840 B1* | 8/2014 | Peterson | B60Q 1/2615 340/425.5 |
| 2001/0028227 A1 | 10/2001 | Lys et al. | |
| 2002/0002444 A1* | 1/2002 | Williams | H05B 37/0245 702/188 |
| 2003/0198059 A1* | 10/2003 | Castro | B60Q 1/326 362/500 |
| 2006/0214595 A1 | 9/2006 | Chen | |
| 2007/0146126 A1* | 6/2007 | Wang | H05B 37/0227 340/517 |
| 2007/0206375 A1 | 9/2007 | Piepgras et al. | |
| 2009/0059603 A1* | 3/2009 | Recker | H05B 37/0272 362/362 |
| 2009/0091440 A1 | 4/2009 | Roman | |
| 2009/0154776 A1* | 6/2009 | Mott | G01N 21/75 382/110 |
| 2010/0141153 A1* | 6/2010 | Recker | H05B 33/0803 315/149 |
| 2011/0163668 A1 | 7/2011 | Jonsson | |
| 2012/0013238 A1 | 1/2012 | Jonsson | |
| 2012/0026726 A1 | 2/2012 | Recker et al. | |
| 2012/0201025 A1 | 8/2012 | Cash | |
| 2013/0163273 A1 | 6/2013 | Ticktin | |

* cited by examiner

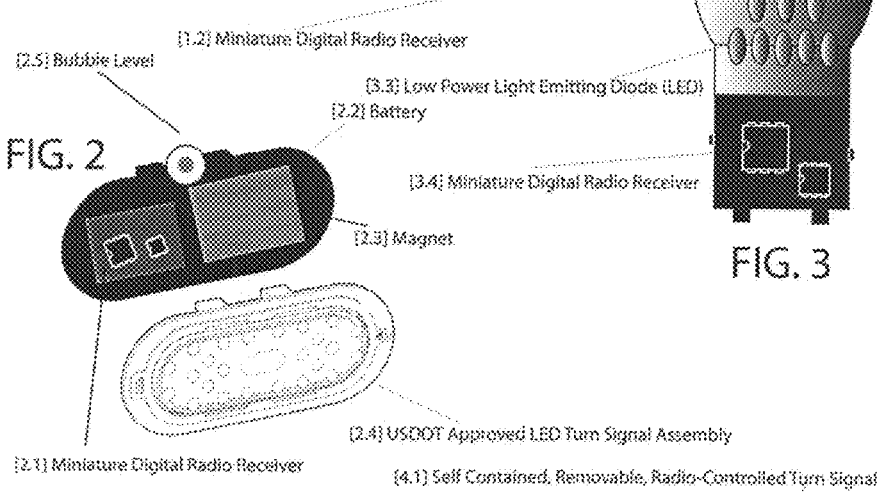

SELF-CONTAINED, REMOVABLE, WIRELESS TURN SIGNAL SYSTEM FOR MOTOR VEHICLES AND TRAILERS

This application is a continuation of U.S. patent application Ser. No. 12/798,219 filed in the U.S. Patent and Trademark Office on Mar. 31, 2010, which claims priority to and the benefit of provisional application Ser. No. 61/212,023, filed on Apr. 4, 2009, which are herein incorporated in their entireties by reference.

BACKGROUND

Antique car owners have long wanted turn signals on their vehicles and trailers although many vehicles were not factory-equipped with turn signals prior to 1950. These cars, although in many cases not legally required to display turn signals, benefit greatly in terms of safety if retrofitted turn signals are installed.

Many antique and specialty vehicle and trailer owners have historically wanted to install accessory turn signal lights on their vehicles, but do not because these non-original equipment items are not only perceived as spoiling the original aesthetic originality of the vehicle or trailer, but having them installed can also result in penalty in judging and concourse car show competitions.

SUMMARY

With the introduction of powerful LED lighting and miniature digital radio-on-a-chip integrated circuits, the inventor found to be possible to embed a sufficiently bright LED array and digital transceiver into a traditional bulb housing. This bulb can then be placed into existing tail or other light socket on the exterior of the vehicle and can serve as turn signals being actuated by radio. This bulb can also be part of a self-contained magnetic housing that can be attached temporarily to the vehicle (such as when on the highway.) This self-contained unit contains miniature digital radio, rechargeable battery, and LED light assembly, but NO reliance upon or modification of the vehicle's electrical system. The system was built and tested and prior art was examined.

The obvious advantage is that no modification of the vehicle wiring or aesthetics is necessary for this installation, achieving safety upgrades but without destroying the originality of the vehicle for concourse evaluation or convenience.

BRIEF DESCRIPTION OF THE DRAWINGS

FIG. 1 is a perspective view of one embodiment of a radio turn signal lever and housing;

FIG. 2 is a perspective view of one embodiment of a stand-alone, magnetic, self-powered, remote-controlled turn signal unit;

FIG. 3 is a perspective view of one embodiment of a self-contained but not self-powered remotely controlled signal bulb; and FIG. 4 is an illustration of an example of a placement of a magnetic self-powered version of the signal unit on a fender of a vehicle.

DETAILED DESCRIPTION

FIG. 1 illustrates a perspective view (simplified in shape of chassis design) of the internal battery operated radio turn signal lever and housing. The housing contains a miniature rechargeable battery, a miniature digital radio IC chip, and two indicator lights to indicate system status.

FIG. 2 illustrates a perspective view of a stand-alone, magnetic, self-powered (independent of vehicle) remote-controlled (via digital radio) turn signal unit. The unit utilizes a magnet for attachment of the unit to the vehicle, a DOT approved bank of high output LED lamps, a miniature digital radio IC chip, and a bubble level attached to the chassis housing for alignment on the vehicle.

FIG. 3 illustrates a perspective view showing a self-contained but not self-powered (it uses existing vehicle socket and lens) remotely controlled signal bulb. In a standard-sized turn signal bulb, a miniature IC digital transceiver is embedded along with an array of high-intensity LED lights. This lamp can either display "brake", "marker" or "turn" intensity of the bulb, depending on both wired and wireless digital control. This is designed as a replacement bulb in existing wiring, with a clear advantage over a traditional taillight or brake lamp in that it can flash brightly as a turn signal does at the control of the vehicle operator.

FIG. 4 is a simple illustration of the placement of the magnetic self-powered version of the signal unit on the fender of a classic vehicle that would not otherwise have turn signals.

Operation

The digital radio/signal lever arm assembly is installed in the vehicle on the steering column. This can be easily removed, and does not require any external wiring or modification of the original vehicle.

The operator of the vehicle actuates the signal lever, which sends a unique digital radio code to the transceiver bulb or assembly. It then lights intermittently with intensity and frequency equal to wired DOT approved turn signals.

As an option to the system, the combined digital transceiver/bulb is installed in an existing, standard tail and brake light socket on the exterior of the vehicle leaving existing wiring untouched.

As another option to the system, self-contained magnetic battery-powered LED assembly and digital radio unit can be magnetically placed on the vehicle for on-road use if the combined digital transceiver/bulb cannot be used on that particular vehicle. This unit is balanced using an integral bubble level for perfect regulatory alignment on vehicle. This assembly can be installed or removed in seconds.

All pieces of the assembly can be removed or installed in seconds and recharged by plugging into a wall outlet. The system also includes a logic that sends a signal to the signal arm and illuminates an indicator if there is a fault in the system (bulb is burned out, out of range, out of battery etc.)

What is claimed is:

1. A self-contained remote controlled vehicular light bulb comprising:
   a light emitting diode;
   a transceiver unit;
   a controller, said controller configured to control illumination of said light emitting diode based upon a control signal received by said transceiver unit; and
   wherein said control signal comprises a unique digital code associated with a remote controller; and
   wherein said controller is configured with logic to detect a fault condition and communicate said fault condition via the said transceiver unit; and
   a housing, the housing configured to interface with and receive power from a standard vehicular light bulb socket, the housing comprising a base and a bulb; and wherein said light emitting diode, said transceiver unit, and said controller are contained within the said housing of said vehicular light bulb.

2. The self-contained remote controlled vehicular light bulb of claim 1 wherein said controller is configured to alter the illumination state of the said light emitting diode to emit a light signal in response to a command from said transceiver wherein said light signal transmits in an intermittent "on" and "off" state, and at a frequency and intensity of reference.

3. The self-contained remote controlled vehicular light bulb of claim 1 wherein said fault condition is chosen from a group of: bulb inoperative; out of range; out of battery; or other fault, and wherein said fault condition is detected by said fault detection logic and are conveyed via said control signal and generated by said transceiver.

* * * * *